(12) United States Patent
Kim et al.

(10) Patent No.: US 11,834,354 B2
(45) Date of Patent: Dec. 5, 2023

(54) ANION INSERTION ELECTRODE MATERIALS FOR DESALINATION WATER CLEANING DEVICE

(71) Applicant: Robert Bosch GmbH, Stuttgart (DE)

(72) Inventors: Soo Kim, Cambridge, MA (US); Mordechai Kornbluth, Brighton, MA (US); Jonathan Mailoa, Cambridge, MA (US); Georgy Samsonidze, San Francisco, CA (US); Michael Metzger, Sunnyvale, CA (US); Saravanan Kuppan, Sunnyvale, CA (US); Sondra Hellstrom, East Palo Alto, CA (US); Boris Kozinsky, Waban, MA (US); Nathan Craig, Burlingame, CA (US)

(73) Assignee: Robert Bosch GmbH, Stuttgart (DE)

( * ) Notice: Subject to any disclaimer, the term of this patent is extended or adjusted under 35 U.S.C. 154(b) by 1017 days.

(21) Appl. No.: 16/595,024

(22) Filed: Oct. 7, 2019

(65) Prior Publication Data

US 2020/0123028 A1    Apr. 23, 2020

Related U.S. Application Data

(60) Provisional application No. 62/749,095, filed on Oct. 22, 2018.

(51) Int. Cl.
*C25B 11/00* (2021.01)
*C02F 1/461* (2023.01)
(Continued)

(52) U.S. Cl.
CPC .......... *C02F 1/46109* (2013.01); *C01D 3/04* (2013.01); *C01F 5/30* (2013.01); *C01P 2002/08* (2013.01);
(Continued)

(58) Field of Classification Search
CPC ........ C02F 1/46109; C02F 2001/46133; C02F 2103/08; C01D 3/04; C01F 5/30; C01P 2002/08; C01P 2006/40; C25B 11/00
See application file for complete search history.

(56) References Cited

U.S. PATENT DOCUMENTS

| 8,298,701 B2 | 10/2012 | Whitacre et al. |
| 8,877,118 B2 | 11/2014 | Kim et al. |

(Continued)

FOREIGN PATENT DOCUMENTS

CN     108264135 A     7/2018

OTHER PUBLICATIONS

Pasta, M. et al., "A Desalination Battery," Nano Letters, 12, 2012 pp. 839-843 (5 pages).
(Continued)

*Primary Examiner* — Zulmariam Mendez
(74) *Attorney, Agent, or Firm* — Maginot, Moore & Beck LLP (57) ABSTRACT

A desalination battery includes a first electrode, a second electrode, an intercalation compound contained in the first electrode, a container configured to contain a saline water solution, and a power source. The intercalation compound includes at least one of a metal oxide, a metalloid oxide, a metal oxychloride, a metalloid oxychloride, and a hydrate thereof with each having a ternary or higher order. The first and second electrodes are configured to be arranged in fluid communication with the saline water solution. The power source is configured to supply electric current to the first and second electrodes in different operating states to induce a reversible intercalation reaction within the intercalation compound. The intercalation compound reversibly stores and releases target anions from the saline water solution to
(Continued)

generate a fresh water solution in one operating state and a wastewater solution in another operating state.

8 Claims, 8 Drawing Sheets

(51) Int. Cl.
  *C01F 5/30* (2006.01)
  *C01D 3/04* (2006.01)
  *C02F 103/08* (2006.01)
(52) U.S. Cl.
  CPC .............. *C01P 2006/40* (2013.01); *C02F 2001/46133* (2013.01); *C02F 2103/08* (2013.01)

(56) References Cited

U.S. PATENT DOCUMENTS

| | | | |
|---|---|---|---|
| 9,111,684 | B2 | 8/2015 | Onagi et al. |
| 9,440,858 | B2 | 9/2016 | Lipka et al. |
| 2010/0021800 | A1 | 1/2010 | Yazami et al. |
| 2011/0274950 | A1 | 11/2011 | Whitacre |
| 2013/0020999 | A1 | 1/2013 | Whitacre |
| 2014/0159668 | A1 | 6/2014 | Whitacre et al. |
| 2014/0305800 | A1 | 10/2014 | Sahu et al. |
| 2015/0274555 | A1* | 10/2015 | Volkel ............... C02F 1/4604 205/746 |
| 2017/0025705 | A1 | 1/2017 | Miara et al. |
| 2017/0275172 | A1 | 9/2017 | Zhao et al. |
| 2018/0247722 | A1 | 8/2018 | Yang et al. |

OTHER PUBLICATIONS

Srimuk, P. et al., "Faradaic deionization of brackish and sea water via pseudocapacitive cation and anion intercalation into few-layered molybdenum disulfide," Journal of Materials Chemistry A, 5, 2017, pp. 15640-15649 (10 pages).

Suss, M. et al., "Water Desalination with Energy Storage Electrode Materials," Joule, 2 (1), 2018, pp. 10-15 (13 pages).

Deunf, E. et al., "Reversible anion intercalation in a layered aromatic amine: a high-voltage host structure for organic batteries," Journal of Materials Chemistry A, 4, 2016, pp. 6131-6139 (9 pages).

Gao, P. et al., "VOCl as a Cathode for Rechargeable Chloride Ion Batteries," Angew. Chem. Int. Ed. 2016, 55, 4285-4290 (6 pages).

Srimuk, P. et al., "Two-Dimensional Molybdenum Carbide (MXene) with Divacancy Ordering for Brackish and Seawater Desalination via Cation and Anion Intercalation," ACS Sustainable Chem. Eng., 2018, 6(3), pp. 3739-3747 (9 pages).

Zhao, X. et al., "Magnesium Anode for Chloride Ion Batteries," ACS Appl. Mater. Interfaces, 2014, 6, pp. 1099-11000 (4 pages).

Wu, W. et al., "Relating Electrolyte Concentration to Performance and Stability for NaTi2(PO4)3/Na0.44MnO2 Aqueous Sodium-Ion Batteries," Journal of The Electrochemical Society, 162 (6), 2015, pp. A803-A808 (6 pages).

Wessells, C. D. et al., "Copper hexacyanoferrate battery electrodes with long cycle life and high power," Nature Communications, 2:550, 2011, pp. 1-5 (5 pages).

Lee, J. et al., "Rocking Chair Desalination Battery Based on Prussian Blue Electrodes," ACS Omega, 2, 2017, pp. 1653-1659 (7 pages).

Floros, N. et al., "Calcium Insertion in the Na4Mn9O18Tunnel Structure: Na1.1Ca1.8Mn9O18," Journal of Solid State Chemistry, 162, 2001, pp. 34-41 (8 pages).

Sauvage, F. et al., "Study of the Insertion/Deinsertion Mechanism of Sodium into Na0.44MnO2," Inorganic Chemistry, 46 (8), 2007, pp. 3289-3294 (6 pages).

Whitacre, J. F. et al., "Na4Mn9O18 as a positive electrode material for an aqueous electrolyte sodium-ion energy storage device," Electrochemistry Communications, 12, 2010 pp. 463-466 (5 pages).

Tevar, A. D. et al., "Relating Synthesis Conditions and Electrochemical Performance for the Sodium Intercalation Compound Na4Mn9O18 in Aqueous Electrolyte," Journal of The Electrochemistry Society, 157 (7), 2010, pp. A870-A875 (6 pages).

Wang, R. Y. et al., "Reversible Multivalent (Monovalent, Divalent, Trivalent) Ion Insertion in Open Framework Materials," Adv. Energy Mater. 5, 2015, 1401869 (10 pages).

Giffin, G. A., "Ionic liquid-based electrolytes for 'beyond lithium' battery technologies," Journal of Materials Chemistry A, 4, 2016, pp. 13378-13389 (12 pages).

Chen, F. et al., "An aqueous rechargeable chloride ion battery," Energy Storage Materials, 7, 2017 pp. 189-194 (6 pages).

Yu, T. et al., "Nanoconfined Iron Oxychloride Material as a High-Performance Cathode for Rechargeable Chloride Ion Batteries," ACS Energy Letters, 2, 2017, pp. 2341-2348 (8 pages).

Chizmeshya, A.V.G. et al., "High-Pressure Properties of Na3ClO Anti-perovskite from First Principles:an exploratory study," Materials Research Society, 499, 1997, pp. 167-172 (6 pages).

Clearfield et al., "Preparation, Structure, and Ion-Exchange Properties of Na4Ti9O20-xH2O", Journal of Solid State Chemistry, vol. 73, Issue 1, Mar. 1988, pp. 98-106 (9 pages).

* cited by examiner

ANION INSERTION ELECTRODE MATERIALS FOR DESALINATION WATER CLEANING DEVICE

This application claims the benefit of U.S. Provisional Application 62/749,095, filed Oct. 22, 2018, the disclosure of which is incorporated herein by reference in its entirety.

FIELD

The disclosure relates to electrochemical treatment of water and more particularly to anion (de-)insertion host materials for electrodes of devices configured to desalinate water.

BACKGROUND

The demand for fresh, potable water is substantial and securing fresh and drinkable water sources for an increasing population on the Earth is one of the most important challenges in the twenty-first century. Increased amounts of fresh water are not only needed for human consumption, but also required for industrial and agricultural activities. Desalination is an emerging technology used to acquire fresh water from otherwise non-fresh sources and involves removing salt and other impurities from seawater. The desalination process can be implemented in different ways such as via thermal (e.g., heating and drying process, thermal distillation), applying electrical energy (i.e., charge-based separation of ions), and via mechanical energy/pressure (e.g., reverse osmosis (RO), membrane-based filtration).

Reverse osmosis (RO) and thermal distillation are techniques that are effective at comprehensive, non-selective removal of ions from water (i.e., deionization). Since these techniques remove water from salts, they are most advantageous when the initial ion load is quite high such as in the case of seawater desalination. However, RO and thermal distillation techniques suffer from generally high cost due to the significant energy inputs required. Charge-based ion separation techniques such as electrodialysis or electroabsorption remove ions from feed water using ion-exchange membranes and/or high-surface-area carbon in connection with an applied potential to attract ions out of the water to an electrode and to limit desorption. These charge-based separation techniques are typically more attractive for brackish water sources or applications that require partial removal of ions from a water stream.

A desalination battery is a newer technology that has been used to desalinate water. The desalination battery typically includes two electrode hosts configured to remove target cations and anions when a voltage is applied to the device. The desalination battery can be operated to separate seawater into a fresh water stream and a brine stream. For the collection of cations, such as the cations $Na^+$, $Mg^{2+}$, $Ca^{2+}$, $K^+$, $Pb^{2+}$, and others, the intercalation or conversion reaction in the cathode part of the desalination battery typically occurs in binary, ternary, or higher oxides and/or cyanides such as $MnO_2$, $Na_{0.44}MnO_2$, $KFeCu(CN)_6 \cdot xH_2O$, sodium nickel- and/or sodium iron-based hexacyanoferrates (HCF) as the working system. On the other hand, the removal of anions, such as the anions $Cl^-$, $SO_4^{2-}$, and others, typically takes place in an Ag/AgCl electrode system. While silver has some advantages, the high price of silver and the poor electronic conductivity of AgCl, which is the primary kinetic limitation of the desalination battery, limit the utility of the Ag/AgCl electrode in practical devices.

What is needed, therefore, is a working electrode system that is scalable for industrial use in terms of chemical process, cost, efficiency, and long-term durability for removing anions from water.

SUMMARY

An intercalation electrode for a desalination battery in one embodiment includes an intercalation compound that contains at least one of a metal oxide, a metalloid oxide, a metal oxychloride, a metalloid oxychloride, and a hydrate thereof each having a ternary or higher order. The intercalation compound is configured to be at least partially immersed in a saline water solution and undergo a reversible intercalation reaction. In a first condition of the intercalation electrode, anions from the saline water solution reversibly insert into sites within the intercalation compound. In a second condition of the intercalation electrode, the anions within the intercalation compound de-insert therefrom into the saline water solution.

A desalination battery in one embodiment includes a first electrode, a second electrode, an intercalation compound contained in the first electrode, a container configured to contain a saline water solution having a first concentration $c_1$ of dissolved salts, and a power source. The intercalation compound includes at least one of a metal oxide, a metalloid oxide, a metal oxychloride, a metalloid oxychloride, and a hydrate thereof each having a ternary or higher order. The first and second electrodes are configured to be arranged in fluid communication with the saline water solution. The power source is configured to supply electric current to the first and second electrodes such that the intercalation compound reversibly stores and releases target anions from the saline water solution located in sites within the first intercalation compound. The desalination battery generates a fresh water solution that has a second concentration $c_2$ of dissolved salts within the container when the intercalation compound stores the target anions. The desalination battery generates a wastewater solution that has a third concentration $c_3$ of dissolved salts within the container when the intercalation compound releases the target anions. The third concentration $c_3$ is larger than the first concentration $c_1$, which in turn is larger than the second concentration $c_2$.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

FIGS. 1-4 illustrate a device 100 for removing ions from a water supply. The device in the embodiment shown is configured as a desalination battery 100. The device 100 has a first electrode 104 that includes a first intercalation host material 108 that reversibly removes and releases first target ions 112 in different operating states of the device via a first reversible intercalation reaction. The first target ions 112 in the illustrated embodiment include single anion species, such as F⁻, Cl⁻, Br⁻, I⁻, and S²⁻; anion complexes, such as $ClO_4^-$, $ClO_3^-$, $ClO_2^-$, $BrO_4^-$, $BrO_3^-$, $SO_4^{2-}$, $SiO_3^{2-}$, and CN⁻; and metal-containing anions, such as $MX_yO_z^{n-}$ (where M=Na, Mg, Al, Si, K, Ca, Sc, Ti, V, Cr, Mn, Fe, Ni, Cu, Zn, Mo, Sn, Cs, and Pb; X=F, Cl, Br, I, N, and P; and $0 < y \leq 5$; $0 \leq z \leq 5$; $1 \leq n \leq 4$) all of which are potentially present in seawater and industrial water.

The device 100 shown in FIGS. 1-4 also includes a second electrode 106 electrically connected to the first electrode 104 via an external circuit 114. The second electrode 106 in some embodiments includes a second intercalation host material 110 that reversibly removes and releases second target ions 116 in the different operating states of the device via a second reversible intercalation reaction. The second target ions 116 can include the cations Na⁺, Mg²⁺, Ca²⁺, K⁺, Pb²⁺, and others. The water supply can also include other ions 118 that do not react with the first electrode 104 or the second electrode 106.

The device 100 further includes a power source, current source, or voltage source 122 configured to supply electric current to the first and second electrodes 104, 106. The electric current is applied to remove the target ions from the water supply. The electric current can be constant current until reaching a predetermined voltage cutoff or positive voltage can be applied to the device 100.

The device 100 in some embodiments includes a container 102 configured to retain a liquid solution such as a water solution 120. The container 102 can be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, desalinated water, contaminated water, industrial water, etc. The container is spacious enough to house a sufficient amount of a water solution undergoing water desalination; dimensions thus differ based on a specific application. The container can be large enough to serve industrial applications. The container can be made from different materials capable of withstanding corrosion, temperature fluctuations, changing pH, varying pressure, and be resistant to other chemical, mechanical, and/or physical conditions.

The container can be made from glass, plastic, composite, metal, ceramic, or a combination of materials. The container can feature one or more protective coatings. The container can be made from a material which minimizes occurrence of water contamination. The container can be made from material(s) which are nontoxic and comply with drinking water standards.

The first and second electrodes 104, 106 are arranged within the device 100 to be in fluid communication with the water solution 120 present in the container 102. The first and second electrodes 104, 106 are at least partially submerged in the water solution 120. The first and second electrodes 104, 106 in some embodiments can be fully submerged in the water solution 120. The first and second electrodes 104, 106 can be placed on the opposite sides of the container 102 as shown in the figures, placed centrally in the container 102, or located on the same side of the container 102. The first and second electrodes 104, 106 can be located next to each other or be separated by a distance. The distance can be 1 mm or more, 1 cm or more, 10 cm or more, 20 cm or more, 30 cm or more, depending on the dimensions of the container 102 and the first and second electrodes 104, 106. Other distances between the first and second electrodes are contemplated as well.

The first and second electrodes 104, 106 with the first and second intercalation materials 108, 110 function as intercalation hosts. Intercalation refers to reversible inclusion of one or more ions into materials with layered structures. The spaces between layers can serve as a temporary storage for one or more types of ions. The first intercalation host material 108 in at least the first electrode 104 reversibly stores and releases anions from the saline water solution having a first concentration $c_1$ of dissolved salts to generate a fresh water solution having a second concentration $c_2$ of dissolved salts and a wastewater solution having a third concentration $c_3$ of dissolved salts within the container such that $c_3 > c_1 > c_2$.

Figure 8:
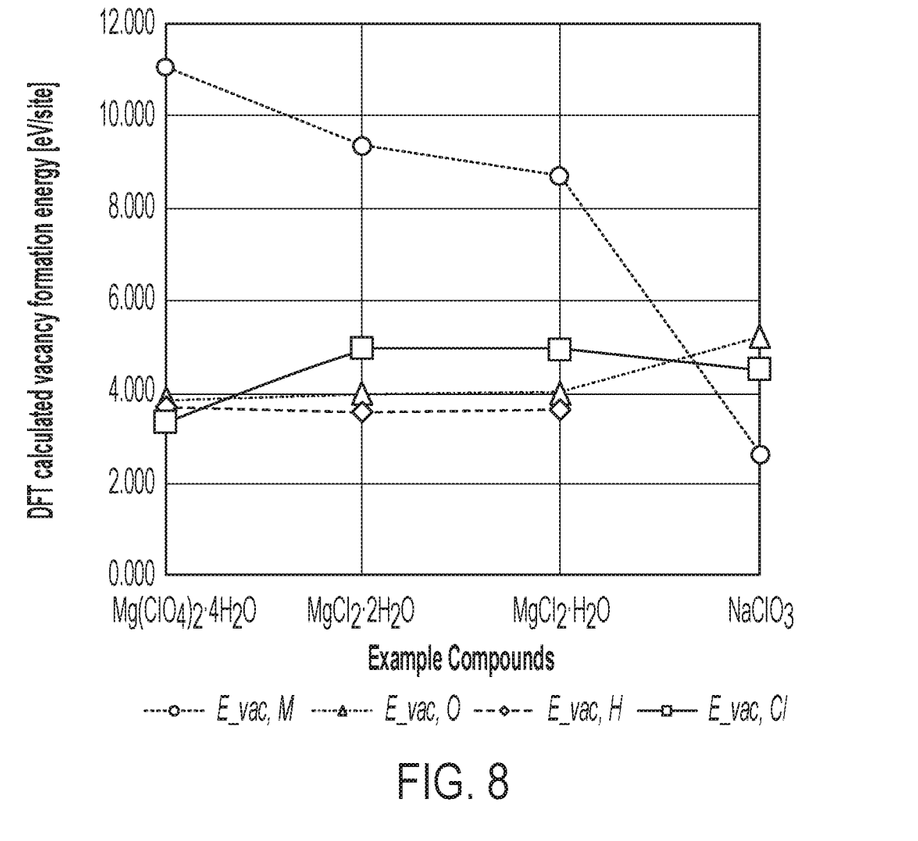
FIG. 8 is a chart that illustrates the density-functional-theory (DFT) calculated vacancy formation energy ($\Delta E_{vac,i}$) of metal (M) (M=Mg or Na), oxygen (O), hydrogen (H), and chlorine (Cl) for compounds that do not satisfy a predefined screening criteria.
Figure 9:
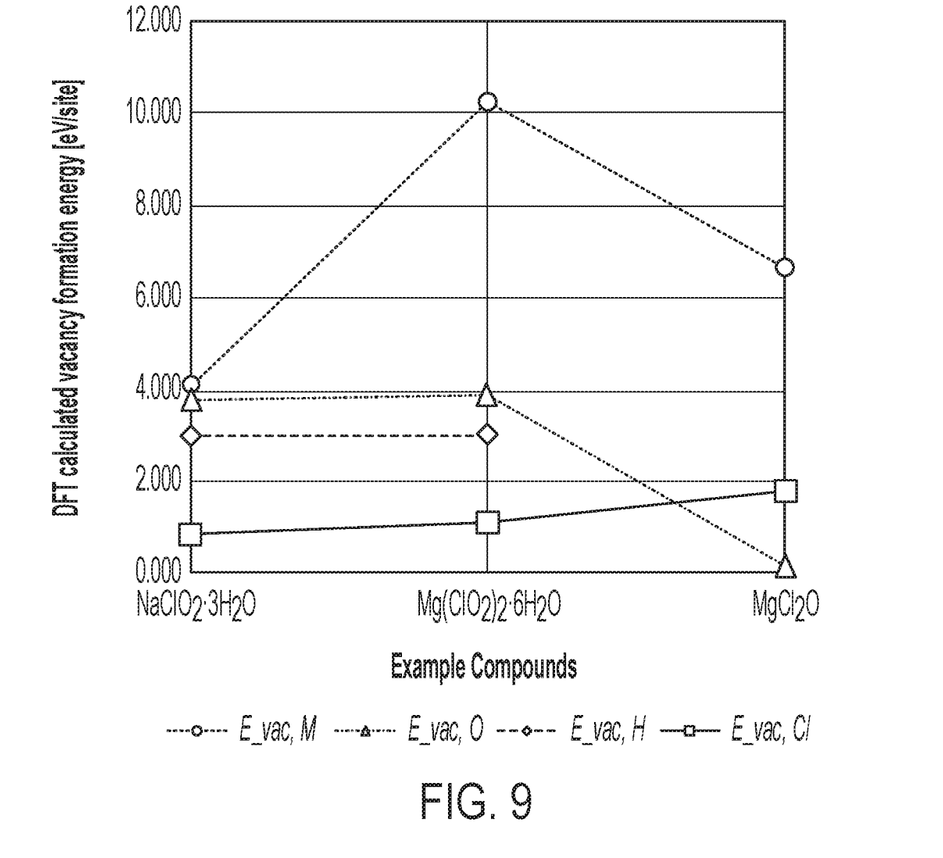
FIG. 9 is a chart that illustrates the DFT calculated vacancy formation energy ($\Delta E_{vac.,i}$) of M (M=Mg or Na), O, H, and Cl for compounds that satisfy the predefined screening criteria.

A comprehensive computational design approach with reaction models determining thermodynamic and electrochemical stability of oxygen- and chlorine-bearing compounds was developed to identify the anion intercalation host material 108 disclosed herein. FIGS. 8 and 9 are respective charts that identify the density-functional-theory (DFT) calculated vacancy formation energy ($\Delta E_{vac.,i}$) of M (M=Mg or Na), O, H, and Cl for selected compounds. For reversible anion (de-)insertion (e.g., Cl⁻), the calculated $\Delta E_{vac.,Cl}$ is to be reasonably small, while $\Delta E_{vac.}$ of M, O, H is to be reasonably high for maintaining the crystal structure intact during the charge/discharge process.

The compounds listed in FIG. 8 do not satisfy these screening criteria because: (1) $\Delta E_{vac.,Cl}$ (square markers) is relatively high ($\geq 3$ eV/Cl) and (2) $\Delta E_{vac.}$ of O and H (triangle markers and diamond markers, respectively) are relatively low when compared to $\Delta E_{vac.,Cl}$. In contrast, the compounds listed in FIG. 9 show relatively low $\Delta E_{vac.,Cl}$ ($\leq 2$ eV/Cl), indicating they are configured for reversible anion (de-)insertion. While the compounds $NaClO_2 \cdot 3H_2O$ and $Mg(ClO_2)_2 \cdot 6H_2O$ exhibit high $\Delta E_{vac}$ of O and H (i.e., high structural stability), the compound $MgCl_2O$ has relatively low $\Delta E_{vac.,O}$. If $\Delta E_{vac.,O}$ is low in any type of compound structures, oxygen will likely (de-)insert with Cl in the form of $ClO_x^{n-}$ (where x can vary from 1 to 4 and n is limited by x, for example, from 1 to 4).

Figure 10:
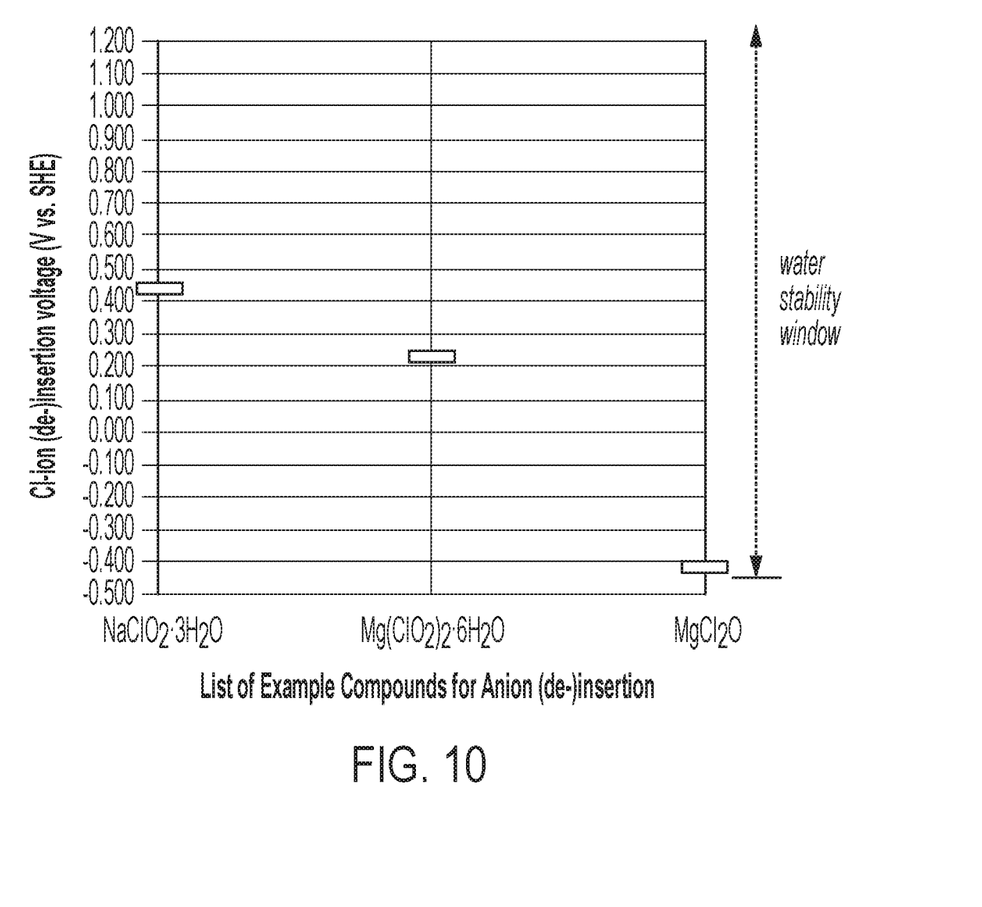
FIG. 10 is a chart that illustrates Cl⁻ ion (de-)insertion voltage (vs. the standard hydrogen electrode (SHE)) based on first-principles DFT calculations for compounds that satisfy the predefined screening criteria.

FIG. 10 is a chart that identifies Cl⁻ ion (de-)insertion voltage (vs. the standard hydrogen electrode (SHE)) for selected compounds based on first-principles DFT calculations. The (de-)insertion voltage must be within the stability window of water (i.e., −0.401 to +1.23 V vs. SHE) to avoid water electrolysis. The selected compounds, which include metal oxychlorides (and hydrates), meet the target voltage criteria so they can be utilized as an electrode component for anion (de-)insertion. In particular, the dash along the leftmost vertical line of the three vertical lines in the chart of FIG. 10 illustrates the Cl⁻ ion (de-)insertion voltage for the compound $NaClO_2 \cdot 3H_2O$. The dash along the middle vertical line of the three vertical lines in the chart of FIG. 10 illustrates the Cl⁻ ion (de-)insertion voltage for the compound $Mg(ClO_2)_2 \cdot 6H_2O$. The dash along the rightmost vertical line of the three vertical lines in the chart of FIG. 10 illustrates the Cl⁻ ion (de-)insertion voltage for the compound $MgCl_2O$.

Figure 5:
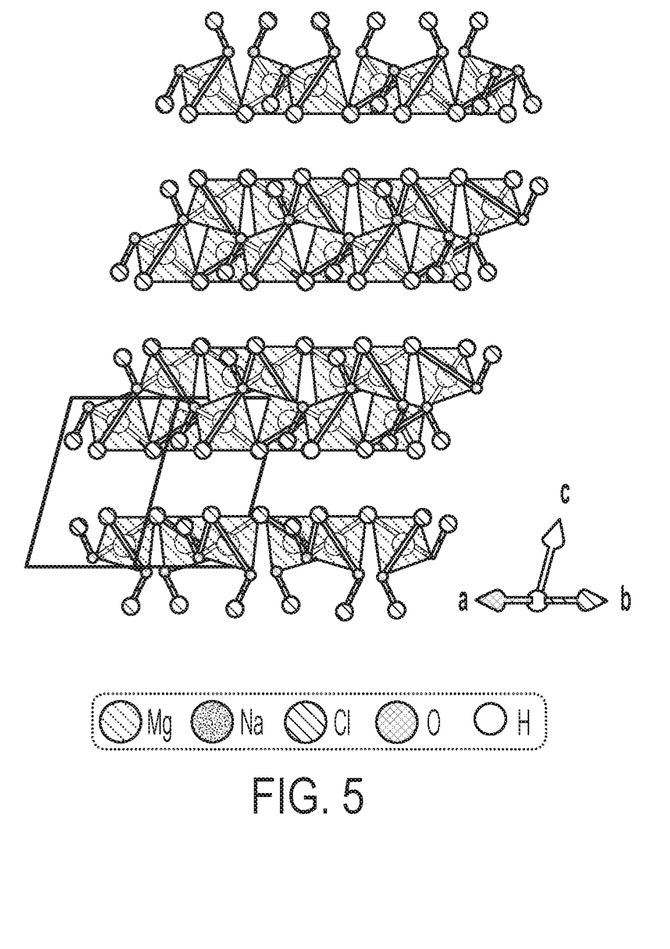
FIG. 5 illustrates the crystal structure of an anion intercalation host electrode formed of monoclinic $p2_1/c$ $MgCl_2O$ to be used in the desalination battery of FIG. 1.
Figure 6:
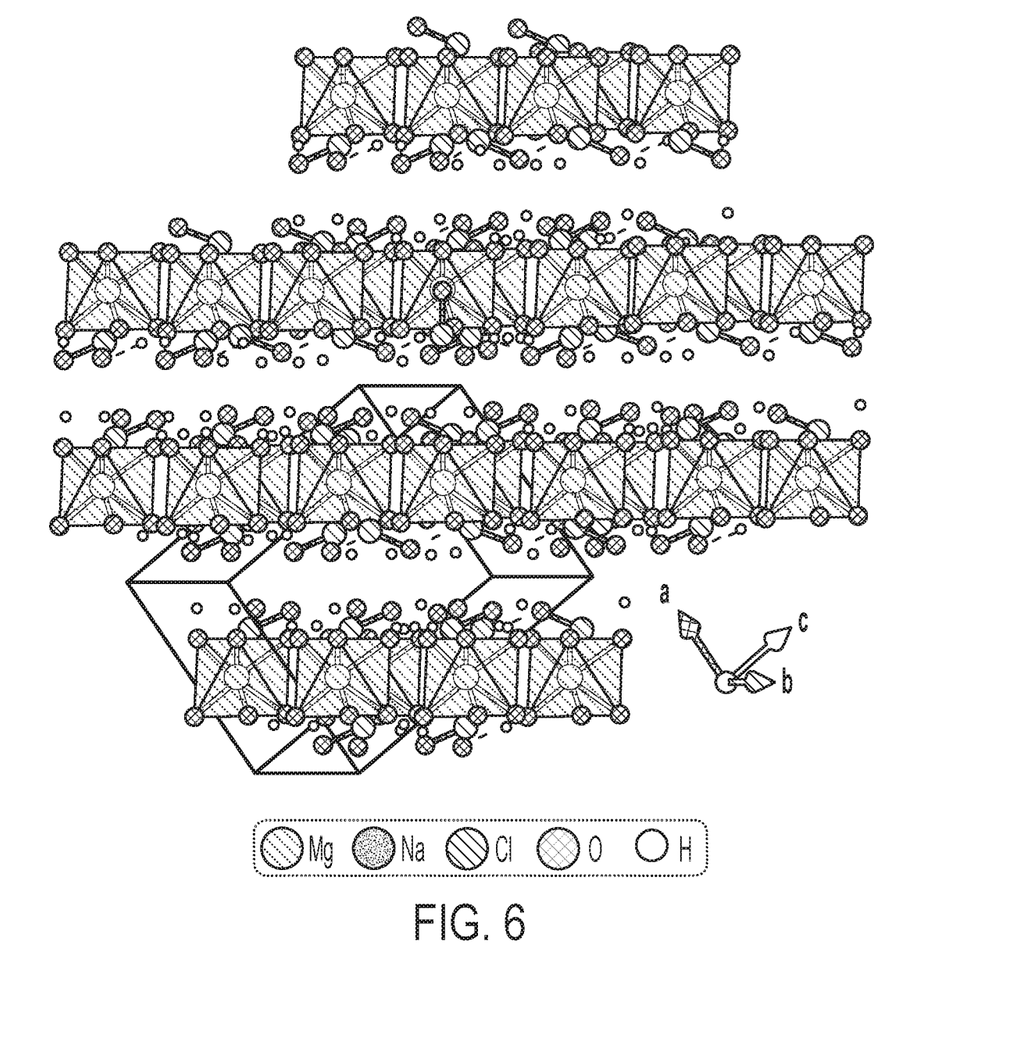
FIG. 6 illustrates the crystal structure of an anion intercalation host electrode formed of tetragonal $p4_2/nmc$ $Mg(ClO_2)_2 \cdot 6H_2O$ to be used in the desalination battery of FIG. 1.
Figure 7:
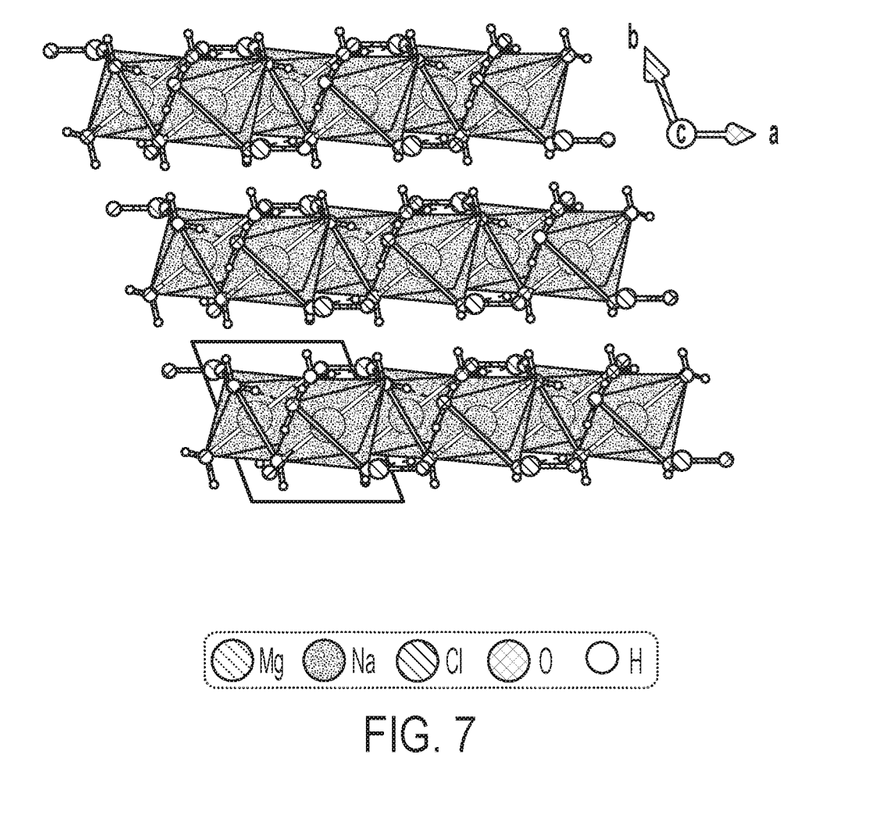
FIG. 7 illustrates the crystal structure of an anion intercalation host electrode formed of triclinic P-1 $NaClO_2 \cdot 3H_2O$ to be used in the desalination battery of FIG. 1.

In view of the computational materials screening criteria described above, the anion intercalation host material 108 disclosed herein in some embodiments includes, but is not limited to, at least one of: $Mg(ClO_2)_2 \cdot 6H_2O$, $MgCl_2O$, and $NaClO_2 \cdot 3H_2O$. FIG. 5 illustrates the crystal structure of monoclinic $p2_1/c$ $MgCl_2O$. FIG. 6 illustrates the crystal structure of tetragonal $p4_2/nmc$ $Mg(ClO_2)_2 \cdot 6H_2O$. FIG. 7 illustrates the crystal structure of triclinic P–1 $NaClO_2 \cdot 3H_2O$. The crystal structures illustrated in FIGS. 5-7 include sodium (Na), magnesium (Mg), oxygen (O), chlorine (Cl), and hydrogen (H). These elements are distinguished from one another in the figures by use of different fill-patterns within the circles representing the elements according the corresponding legends. In other embodiments, the anion intercalation host material 108 disclosed herein includes, but is not limited to, at least one of the following ternary and quaternary metal oxides and metal oxychlorides: $AlH_{12}(ClO_2)_3$, $MnH_8(ClO_2)_2$, $FeH_8(ClO_2)_2$, and $NiH_8(ClO_2)_2$.

The first electrode 104 with the anion intercalation host material 108 disclosed herein has a (de-)insertion voltage for single anion species (i.e., Cl⁻), anion complexes, and metal-containing anions that is lower than the metal dissolution potential, lower than the oxygen gas evolution potential, and within a (de-)insertion voltage range of −0.5 to 1.5 V vs. SHE, which is slightly larger than the water stability window, so as to avoid water electrolysis. In some embodiments, the first electrode 104 with the anion intercalation host material 108 disclosed herein has a thermodynamic Cl vacancy formation energy that is higher than 0.8 eV per Cl site and lower than 2.8 eV per Cl site. In these embodiments, the anion intercalation host material 108 has metal, oxygen, and hydrogen thermodynamic vacancy formation energies that are higher than the Cl vacancy formation energy. In some embodiments, the (de-)insertion voltage for Cl⁻ and related anion complexes exceeds outside of the (de-)insertion voltage range to overcome kinetically-limited ion diffusions and/or account for overpotential caused by the possible formation of passivation (or protective) layer.

The anion intercalation host material 108 disclosed herein in some embodiments includes, but is not limited to, at least one of the following alkali-metal-based and transition-metal-based oxychlorides and their hydrates: $Ca_4Cl_6O$, $CaHClO$, $NaH_4ClO_2$, $AlClO$, $Si_3(Cl_4O)_2$, $SiCl_2O$, $Si_6Cl_{10}O_7$, $SiCl_2O$, $Si_2Cl_2O_3$, $Ti(ClO_4)_4$, $TiClO$, $Mn_8Cl_3O_{10}$, $MnH_4(ClO)_2$, $FeClO$, $Ni(ClO_4)_2$, $NiH_{16}(ClO_8)_2$, $NiH_{12}(ClO_3)_2$, $Cu_2Cl_2O$, and $CuH_8(ClO_5)_2$.

The anion intercalation host material 108 disclosed herein in some embodiments includes $M(ClO_2)_x$, where M can be Mg, Ca, or Na, or can be Al, Si, Fe, Co, Ni, Cr, V, Ti, Cu, Zr, Nb, W, Mo, Mn, or combinations thereof.

The anion intercalation host material 108 disclosed herein in some embodiments includes $MA_xO_y \cdot zH_2O$, where M can be Mg, Ca, Na, Al, Si, Fe, Co, Ni, Cr, V, Ti, Cu, Zr, Nb, W, Mo, Mn, or combinations thereof, A may be Cl, F, Br, I, N, or P, or combinations thereof, and 0<x, y, z<7.

The first electrode 104 can include the anion intercalation host material 108 disclosed herein blended with additives for stability, conductivity, and/or physical properties. The second electrode 106 can also include additives for stability, conductivity, and/or other physical properties in addition to the active material 110.

A non-limiting example of a conductivity agent can include carbon black, conductive carbon black, amorphous carbon, carbon fibers, quaternary ammonium salt(s), alkyl sulfonate(s), halogen-free cationic compound(s), the like, or a combination thereof.

A non-limiting example of a polymeric binder can be polyvinylidene fluoride (PVdF), polyacrylonitrile (PAN), poly(methyl methacrylate) (PMMA), polyethylene glycol (PEO), polyimide, polydopamine, poly(ethylene glycol) diacrylate, polymethylpentene, nylon, metal-aramid, polyether imide, copolyester, polyetherketone, carboxymethyl cellulose, styrene-butadiene rubber (SBR), copolymers and blends such as poly(vinylidenefluoride-hexafluoropropylene) (PVdF-HFP), poly(vinylidenefluoride-chlrotrifluoroethylene) (PVdF-CTFE), poly(methyl methacrylate-vinyl acetate) (PMMA-VAc), poly(ethylene glycol) diacrylate (PEGDA), poly(methyl methacrylate-acrylonitrile-vinyl acetate) (PMMA-AN-VAc), poly(methyl methacrylate-co-butyl acrylate) (PMMA-co-BA), poly(3,4-ethylenedioxythiophene) polystyrene sulfonate-co-polyethylene glycol (PEDOT-co-PEG), the like, or a combination thereof. In one embodiment the first electrode 104 includes about 70 to 95 wt. % intercalation host material 108 mixed as a slurry in a solvent (e.g., NMP) with about 1 to 20 wt. % carbon black and about 1 to 20 wt. % polymer binder based on the total weight of the electrode.

With reference again to FIGS. 1-4, the device 100 in some embodiments is arranged in a water supply system (not shown) that includes various pumps, conduits, valves, and related components to transport water from a source to an end user. The container 102 of the device 100 in one embodiment is arranged in the water supply system such that the water solution 120 enters the container 102 at an input side 124 and exits the container 102 at an output side 128. As the water solution 120 is moved in a flow direction 132 through the container 102 and over at least a portion of the first electrode 104, the device 100 is configured to have different operating states that enable it to reversibly remove the first target ions 112 from the water solution 120. The flow direction 132 shown in FIGS. 1-4 is for reference only and can be reversed in other embodiments. If the flow direction is reversed, the locations of the input side 124 and the output side 128 of the device will be reversed as well.

Figure 1:
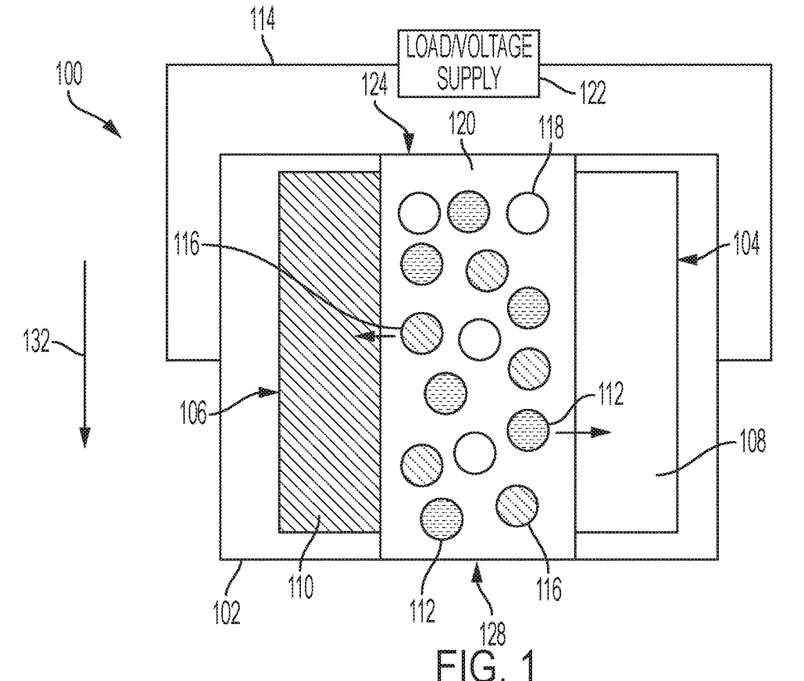
FIGS. 1-4 depict a simplified schematic of a desalination battery in different operating states, the desalination battery including at least one electrode with an electrode material configured to reversibly store and release target anions from a water supply.

FIG. 1 illustrates the device as a desalination battery 100 in a first operating state. The water solution 120 to be dechlorinated/desalinated (i.e., seawater) is fed to the input side 124 of the battery 100 and immerses the first electrode 104. Concurrently, a voltage is applied to the first electrode 104 to induce the first electrode 104 to remove the first target ions 112 via intercalation. As shown, the first electrode 104 at the start of the first operating states is fully charged such that it does not contain mobile first target ions 112. In some embodiments, the first electrode 104 at the start of the first operating state may contain some mobile first target ions 112 in an amount less than a full capacity of the mobile first target ions 112 in the first electrode 104. In one embodiment, the first electrode 104 includes up to 10% of the full capacity of the mobile first ions 112 in the first electrode 104 at the start of the first operating state.

Figure 2:
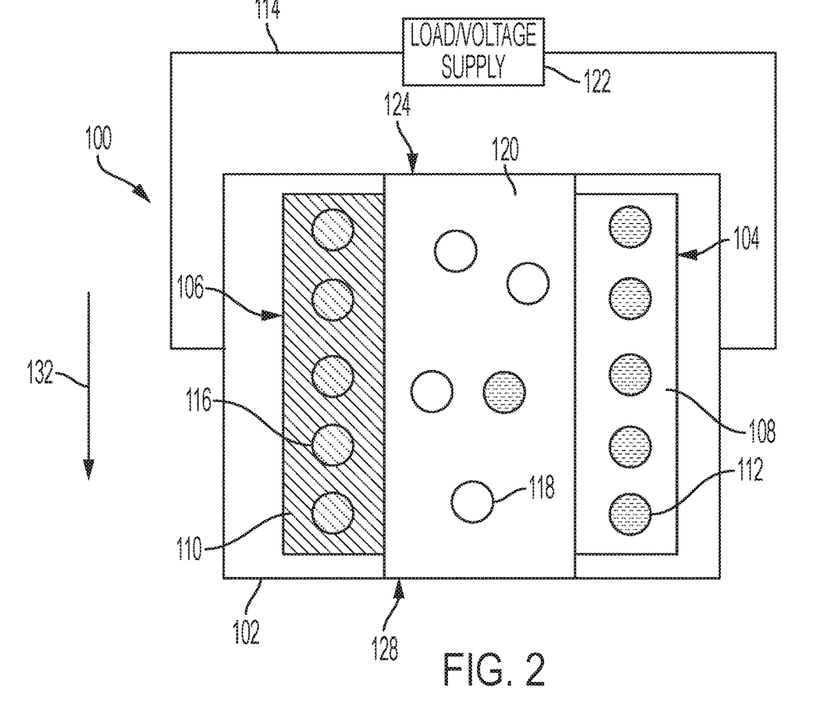

A comparison of FIGS. 1 and 2 illustrates the changing condition of the water solution 120 and the first electrode 104 as the battery 100 functions in the first operating state. As shown, the first target ions 112 are removed from the water solution 120 and intercalated into the first electrode 104. The water solution 120 that exits the output side 128 of the battery 100 when the battery is operated in the first operating state will contain a lower concentration of the first target ions 112 than the water that enters the input side 124 of the battery 100. In the embodiment in which the first target ions 112 are the anion Cl$^-$, the water solution 120 exiting the battery 100 will be a fresh water solution or a dechlorinated water solution. The battery 100 in the embodiment shown also includes the second electrode 106, which removes the second target ions 116 via intercalation into the second electrode 106. In the embodiment in which the second target ions 116 are the cation Na$^+$, the water solution 120 exiting the battery 100 will be a desalinated water solution. The first operating state of the battery 100 is sometimes referred to as a "purification cycle" since the removal of the first target ions 112 purifies the water stream exiting the battery 100. The voltage applied to the first and second electrodes 104, 106 in the first operating state is configured to be within −0.5 to 1.5 V, which is slightly larger than the stability window of water (i.e., −0.401 to +1.23 V vs. SHE), so as to avoid water electrolysis.

Figure 3:
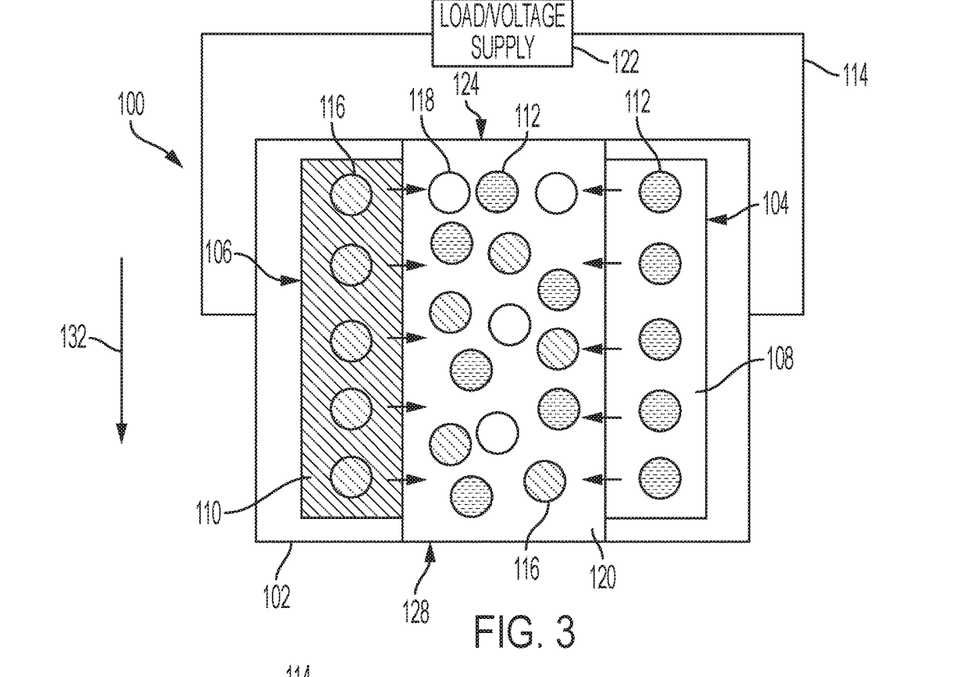
Figure 4:
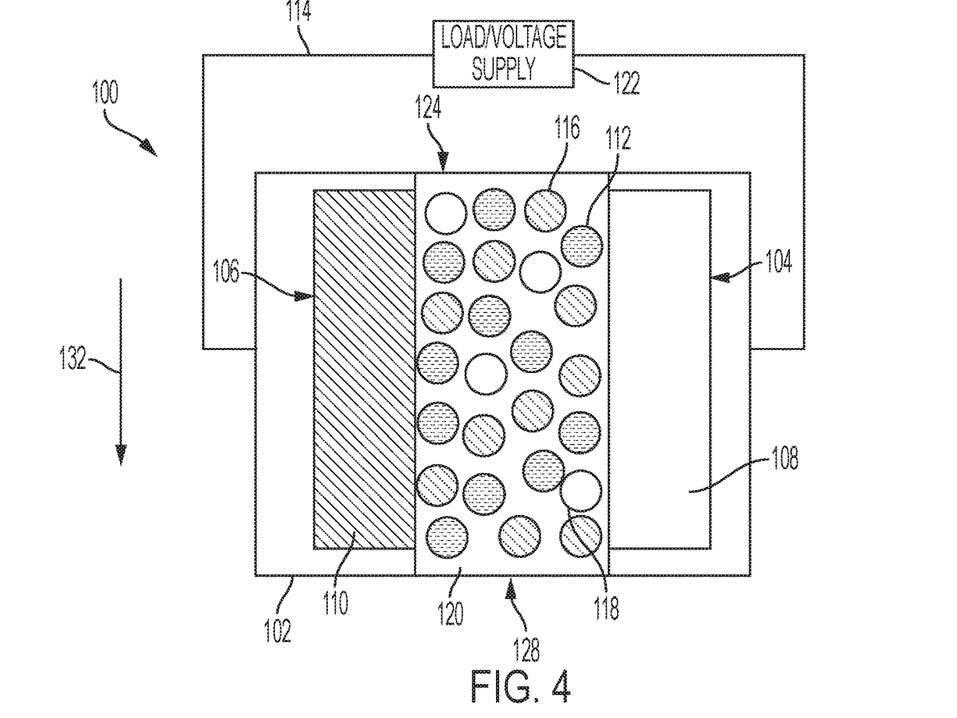

FIG. 3 illustrates the battery 100 in a second operating state in which the first electrode 104 is fully discharged such that it is saturated with the first target ions 112. Additional seawater 120 is fed to the input side 124 of the battery while a reversed voltage is applied to the first electrode 104 to induce the first electrode 104 to release the first target ions 112. A comparison of FIGS. 3 and 4 illustrates the changing condition of the water solution 120 and the first electrode 104 as the battery 100 functions in the second operating state. As shown, the first target ions 112 are released into the water solution 120 from the first electrode 104. In the embodiment shown, the second electrode 106 also releases the second target ions 116 into the water solution 120. The water solution 120 that exits the output side 128 of the battery 100 when the battery is operated in the second operating state will contain a higher concentration of the first target ions 112 and the second target ions 116 than the water that enters the input side 124 of the battery 100. As such, this water is sometimes referred to as a wastewater stream or solution or a brine stream or solution. The voltage applied to the first electrode 104 in the second operating state is also configured to be within −0.5 to 1.5 V vs. SHE. The first electrode 104 upon release of all the first target ions 112 is once again fully charged and ready for a subsequent purification cycle.

The battery 100 can be a closed or open system. The battery 100 can operate in cycles (intercalation and de-intercalation), where the water solution 120 flows continuously. Under the continuous flow, the desalinated water solution exiting the container 102 can be stored in a reservoir (not shown). Alternatively, the battery 100 can operate as a batch desalination battery, where a limited amount of the water solution 120 is supplied and held in the container 102 to be cleaned in a smaller scale operation.

The anion intercalation host material 108 disclosed herein has many advantages. A simple metal oxide, metal oxychlorides, and/or their hydrates and/or their combination can be used to selectively remove the anion such as Cl$^-$ from aqueous streams (hardness removal from drinking water is also an application). The anion intercalation host material 108 disclosed herein can reversibly remove and release the anions present in the seawater, brackish water and industrial water without severe structural and mechanical damage on the bulk electrode materials.

During the electrochemical charge/discharge processes, the (de-)insertion of anions (e.g., Cl$^-$, ClO$_2^-$, ClO$_4-$, etc.) is thermodynamically favored (reversibly) over decomposing the electrodes host by extracting other elements within the compounds (e.g., metal, oxygen, hydrogen, etc.), which has been verified by thermodynamic-based first-principles DFT calculations.

The developed computational methods have identified the general design principles (i.e., structural feature necessary) for compounds that can lead to reversible anion (de-)intercalation and these principles can be extended to other metal oxide, metal oxychlorides, and their hydrates.

The anion intercalation host material 108 disclosed herein can host anion species by: (1) acting as a host for single element anion (e.g., Cl—, F—, etc.), (2) hosting anion complexes such as ClO$_2^-$, SO$_4^{2-}$, etc., and (3) (de-)inserting metal anion clusters, for example, AlCl$_4^-$, MgCl$_3^-$, etc.

The ionicity and solvation to water can be further modified and tuned by full- and/or partial-substitution of metal and metalloid M that has a higher electronegativity value in MO$_x$Cl$_y$·zH$_2$O systems (i.e., making the compounds less ionic and more covalent).

The anion intercalation host material 108 disclosed herein (which includes ternary, quaternary, and higher order metal oxides, metalloid oxides, metal(-loid) oxychlorides, and the hydrate forms) can reversibly uptake anions, including the single anion species such as F$^-$, Cl$^-$, Br$^-$, I$^-$, S$^{2-}$, anion complexes including but not limited to ClO$_4^-$, ClO$_3^-$, ClO$_2^-$, BrO$_4^-$, BrO$_3^-$, SO$_4^{2-}$, SiO$_3^{2-}$, CN$^-$, and metal-containing anions such as M$X_yO_z^{n-}$ (M=Na, Mg, Al, Si, K, Ca, Sc, Ti, V, Cr, Mn, Fe, Ni, Cu, Zn, Mo, Sn, Cs, and Pb; X=F, Cl, Br, I, N, and P; 0<y≤5; 0≤z≤5; 1≤n≤4) potentially present in seawater and industrial water for cleaning and desalination purposes, thereby improving the performance and efficiency of desalination water cleaning device and process, relative to existing technologies that employ silver-based AgCl electrodes.

Compared to the Ag/AgCl anodes used in existing desalination batteries, the anion intercalation host material 108 disclosed herein can be mass-produced at industrial scale via a simple, facile and cost-effective solid-state, or solution-based synthetic routes.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An intercalation electrode for a desalination battery, comprising:
    an intercalation compound that contains at least one of a metal oxide, a metalloid oxide, a metal oxychloride, a metalloid oxychloride, and a hydrate thereof with each having a ternary or higher order, the intercalation compound configured to be at least partially immersed in a saline water solution and undergo a reversible intercalation reaction in which (i) anions from the saline water solution reversibly insert within the intercalation compound in a first condition of the electrode and (ii) the anions within the intercalation compound de-insert therefrom into the saline water solution in a second condition of the electrode, wherein the intercalation compound has the chemical formula $MA_xO_y \cdot zH_2O$, where M=Al, Ca, Co, Cr, Cu, Fe, Mg, Mn, Mo, Na, Nb, Ni, Si, Ti, V, W, Zr, or a combination thereof, A=Br, Cl, F, I, N, P, or a combination thereof, and 0<x, y, z<7.

2. The intercalation electrode of claim 1, wherein a voltage in which the anions insert into and de-insert from the intercalation compound in the first and second conditions, respectively, is within a voltage range of −0.5 to 1.5 V.

3. The intercalation electrode of claim 2, wherein the voltage exceeds the voltage range by up to 0.4 V to one or more of (i) overcome kinetically-limited ion diffusions and (ii) account for overpotential caused by a passivation layer formed on the intercalation electrode.

4. The intercalation electrode of claim 1, wherein a voltage in which the anions insert into and de-insert from the intercalation compound in the first and second conditions, respectively, is lower than both a metal dissolution potential and an oxygen gas evolution potential.

5. The intercalation electrode of claim 1, wherein the intercalation compound has (i) a vacancy formation energy of $Cl^-$ that is between 0.8 and 2.8 eV per Cl site and (ii) respective vacancy formation energies of one or more of metal, oxygen, and hydrogen that are higher than the vacancy formation energy of $Cl^-$.

6. The intercalation electrode of claim 1, further comprising at least one conductivity agent and at least one polymeric binder blended with the intercalation compound, the intercalation compound, the conductivity agent, and the polymeric binder representing about 70 to 90 wt. %, about 1 to 20 wt. %, and about 1 to 20 wt. %, respectively, based on the total weight of the electrode.

7. An intercalation electrode for a desalination battery, comprising:

an intercalation compound that contains at least one of a metal oxide, a metalloid oxide, a metal oxychloride, a metalloid oxychloride, and a hydrate thereof with each having a ternary or higher order, the intercalation compound configured to be at least partially immersed in a saline water solution and undergo a reversible intercalation reaction in which (i) anions from the saline water solution reversibly insert within the intercalation compound in a first condition of the electrode and (ii) the anions within the intercalation compound de-insert therefrom into the saline water solution in a second condition of the electrode, wherein the intercalation compound has at least one of the chemical formulas $Mg(ClO_2)_2 \cdot 6H_2O$, $MgCl_2O$, and $NaClO_2 \cdot 3H_2O$.

8. An intercalation electrode for a desalination battery, comprising:

an intercalation compound that contains at least one of a metal oxide, a metalloid oxide, a metal oxychloride, a metalloid oxychloride, and a hydrate thereof with each having a ternary or higher order, the intercalation compound configured to be at least partially immersed in a saline water solution and undergo a reversible intercalation reaction in which (i) anions from the saline water solution reversibly insert within the intercalation compound in a first condition of the electrode and (ii) the anions within the intercalation compound de-insert therefrom into the saline water solution in a second condition of the electrode, wherein the intercalation compound has at least one of the chemical formulas $AlH_{12}(ClO_2)_3$, $FeH_8(ClO_2)_2$, $MnH_8(ClO_2)_2$, and $NiH_8(ClO_2)_2$.

* * * * *